US011907173B1

(12) United States Patent
Warfield et al.

(10) Patent No.: US 11,907,173 B1
(45) Date of Patent: Feb. 20, 2024

(54) COMPOSABLE NETWORK-STORAGE-BASED FILE SYSTEMS

(71) Applicant: Amazon Technologies, Inc., Seattle, WA (US)

(72) Inventors: Andrew Kent Warfield, Vancouver (CA); Jacob Wires, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 80 days.

(21) Appl. No.: 17/457,853

(22) Filed: Dec. 6, 2021

(51) Int. Cl.
*G06F 16/182* (2019.01)
*G06F 16/172* (2019.01)
*G06F 9/54* (2006.01)

(52) U.S. Cl.
CPC ............ *G06F 16/183* (2019.01); *G06F 9/547* (2013.01); *G06F 16/172* (2019.01)

(58) Field of Classification Search
None
See application file for complete search history.

(56) References Cited

U.S. PATENT DOCUMENTS 7,117,504 B2 * 10/2006 Smith .................. G06F 8/20
709/227
2014/0082145 A1 * 3/2014 Lacapra ................ H04L 67/01
709/219

FOREIGN PATENT DOCUMENTS

CN 106462601 A * 2/2017 ............. G06F 9/466

\* cited by examiner

*Primary Examiner* — Tuankhanh D Phan
(74) *Attorney, Agent, or Firm* — Knobbe, Martens, Olson & Bear, LLP (57) ABSTRACT

Systems and methods are provided for exposing disparate storage systems and technologies to compute instances through a unified file system interface that is agnostic to the underlying storage systems and technologies. A file system namespace service may provide the ability to compose a file system from different storage technologies and systems (e.g., block storage, object storage, etc.). The file system namespace service may also provide the ability to layer different storage services (e.g., by treating local block storage volume as a write back cache, by treating a file system as a read-through cache in front of an object storage service, etc.), and/or the ability to bind virtual files to other compute instances and/or storage systems.

20 Claims, 6 Drawing Sheets

COMPOSABLE NETWORK-STORAGE-BASED FILE SYSTEMS

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

Data centers may provide data storage services configured to store data submitted by client devices, and enable retrieval of that data over a network. A variety of types of data storage services can be provided, often varying according to their input/output (I/O) mechanisms. For example, database services may allow I/O based on a database query language, such as the Structured Query Language (SQL). Block storage services may allow I/O based on modification to one or more defined-length blocks, in a manner similar to how an operating system interacts with local storage, and may thus facilitate virtualized disk drives usable, for example, to store an operating system of a virtual machine. Object storage services may allow I/O at the level of individual objects or resources, such as individual files, which may vary in content and length.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Generally described, the present disclosure relates to exposing disparate storage systems and technologies to compute instances through a unified file system interface that is agnostic to the underlying storage systems and technologies. Beneficially, this enables compute instances and applications to utilize any or all types of storage available within a network computing environment through a single set of commands as though the storage is part of a local file system, regardless of the network location and/or underlying technology of the actual physical storage. A file system namespace service provides the ability to compose a file system from different storage technologies and systems (e.g., block storage, object storage, etc.). The file system namespace service may also provide the ability to layer different storage services (e.g., by treating local block storage volume as a write back cache, by treating a file system as a read-through cache in front of an object storage service, etc.), and/or the ability to bind virtual files to other compute instances and/or storage systems.

Some conventional storage systems allow use of disparate storage systems and technologies. For example, an application may use a local storage volume, a network-based object storage service, a network-based virtualized block storage service, other storage systems, or any combination thereof. However, to use such disparate storage systems and technologies, the application is typically programmed to communicate using different application programming interfaces for each of the storage systems, or subsets thereof. Moreover, if it is desired to change the storage system or underlying storage technology for certain data, the application may require revisions to use the different storage systems, thus creating an obstacle to changing storage systems or leveraging new storage systems.

Some aspects of the present disclosure address the issues noted above, among others, by implementing a file system namespace service. The file system namespace service can manage the mapping of file system directories and files to various storage targets so that compute instances can access the storage targets using a unified file system interface. In some embodiments, namespace metadata (e.g., in a configuration file, also referred to as a manifest) may define the particular mappings to be implemented for a compute instance that is instantiated using the configuration file. For example, the configuration file may specify that a boot volume for the compute instance is to be mapped to a particular image in a network-based registry, that a particular directory of the compute instance's file system is to be mapped to a particular bucket of an object storage service, that another directory of the file system is to be mapped to another bucket of the object storage service, that a third directory of the file system is to be mapped to a portion of a block storage volume, that a particular file is to be mapped to a particular network storage location, and so on. When a compute instance is instantiated using the namespace metadata, the file system namespace service can generate a namespace for the compute instance (e.g., a unique name for the file system of the compute instance), and process the namespace metadata so that file system commands associated with the namespace can be properly mapped to underlying storage systems and forwarded thereto. When an application is launched within the compute instance, the application may generate a file system access command (e.g., a command to read a file in a particular directory of the file system namespace for the compute instance). The file system access command may be forwarded out of the compute instance to the namespace service, which can determine the storage system, location, etc. to which the file system access command applies. A component of the server on which the compute instance is executing (e.g., a file system namespace driver or other client) can then send the corresponding storage access command to the appropriate storage system to access the data that is the subject of the file system access command. In this way, the application executing in the compute instance can access data across any number of storge systems, technologies, and network locations just as though the storage is part of the file system of the compute instance.

Additional aspects of the present disclosure relate to composing files of network-accessible storage locations, executable code, or a combination thereof. In some embodiments, a file or directory of the file system namespace may be mapped to an application or executable function such that a file system command associated with the file or directory (e.g., a write or read command) is forwarded to the application or causes invocation of the function. The result of the request may be provided back to the compute instance in the appropriate form for the command. For example, an application or executable function may be implemented to inform the compute instance—and, in some cases, any number of additional compute instances—of a next unit of work to be done. The particular unit of work to be done may be context dependent, such as based on work done by other compute instances, attributes of the current compute instance, or the like. When the compute instance is ready to perform a next unit of work, the compute instance may execute a read command against a file that is presented as part of the file system for the compute instance. The read command may be forwarded to the application or function, which may programmatically determine the next unit of work to be performed and return data regarding that unit of work as though it were read from a file. In some embodiments, other compute instances may also execute read commands against files that are forwarded to the same or a similar application or function. Write requests may be handled in a similar manner, whereby data that is to be written is stored and/or programmatically modified, provided to other compute instances, etc. In this way, different applications executing on different compute instances may coordinate or communicate with each other using a standard file system interface, and the details of programmatic execution can be transparently offloaded.

Various aspects of the disclosure will now be described with regard to certain examples and embodiments, which are intended to illustrate but not limit the disclosure. Although aspects of some embodiments described in the disclosure will focus, for the purpose of illustration, on particular examples of file system interfaces, storage systems, compute instances, and file system commands, the examples are illustrative only and are not intended to be limiting. In some embodiments, the techniques described herein may be applied to additional or alternative file system interfaces, storage systems, compute instances, file system commands, and the like. Any feature used in any embodiment described herein may be used in any combination with any other feature, without limitation.

Overview of Example Computing Environment

Figure 1:
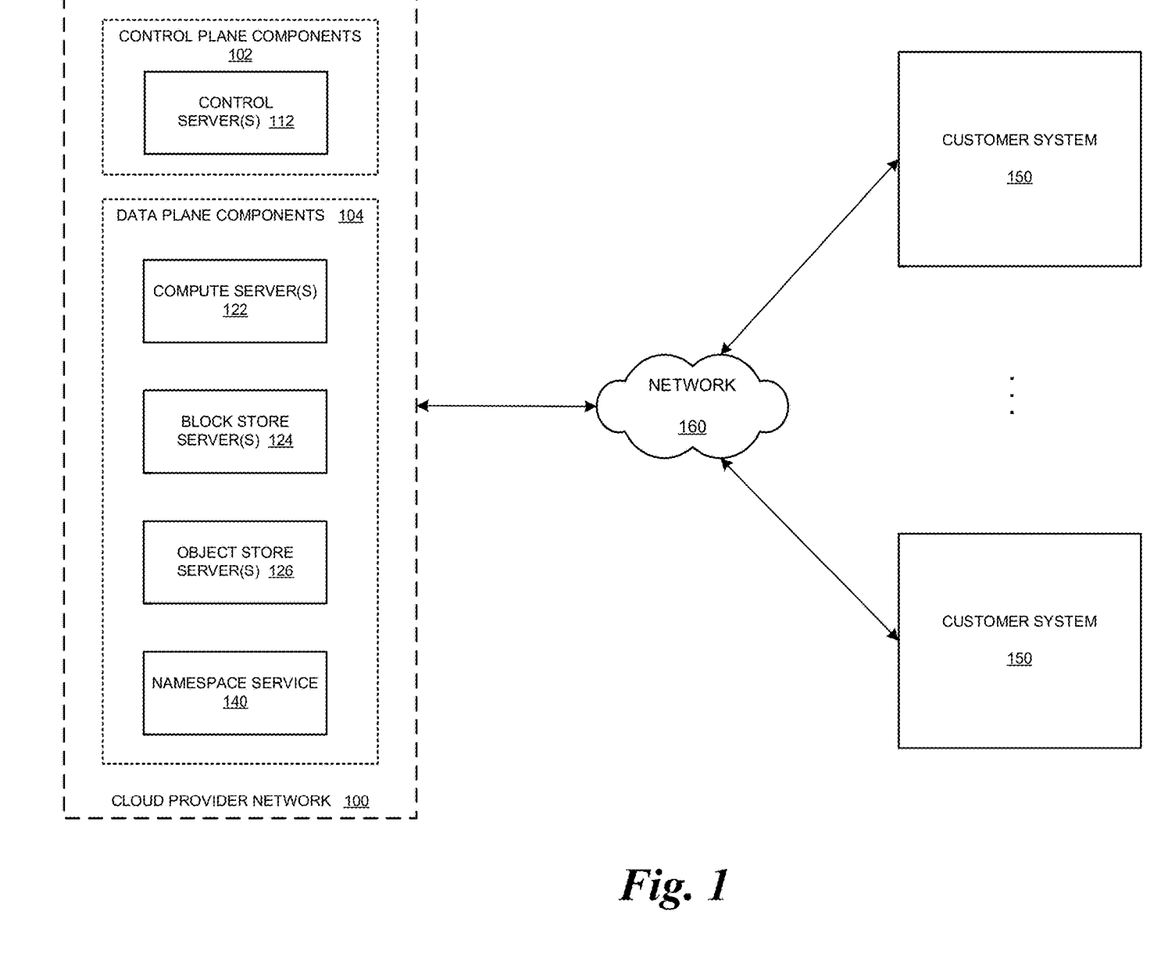
FIG. 1 is a block diagram depicting an illustrative environment in which a file system namespace service can operate according to some embodiments.

With reference to an illustrative embodiment, FIG. 1 shows an example computing environment in which features of the present disclosure may be implemented. As shown, the computing environment includes a cloud provider network substrate 100 (also referred to herein as a "cloud provider network," "provider network," "cloud provider system", or simply as a "cloud" for convenience), and any number of customer systems 150 (also referred to herein simply as "customers" for convenience) that access data storage and compute resources at the cloud provider network 100 or otherwise interact with the cloud provider network 100. The cloud provider network 100 and customers 150 may communicate with each over via an intermediate network 160, such as an intranet or the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of CPUs and GPUs, optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

A cloud provider network 100 can be formed as a number of regions, where a region is a separate geographical area in which the cloud provider clusters data centers. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network). Transit Centers ("TC") are the primary backbone locations linking customers to the cloud provider network, and may be co-located at other network provider facilities (e.g., Internet service providers, telecommunications providers). Each region can operate two TCs for redundancy.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112, etc.) can have an IP address in the substrate network. Hardware virtualization technology can enable multiple operating systems to run concurrently on a host computer, for example as virtual machines ("VMs") on a compute server. A hypervisor, or virtual machine monitor ("VMM"), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes customer resources that are implemented on the cloud provider network 100 (e.g., computing instances, containers, block storage volumes, databases, file storage, etc., as described in greater detail below). Data plane traffic generally includes non-administrative operations such as transferring data to and from the customer resources.

Certain control plane components 102 (e.g., tier one control plane components such as the control plane for a virtualized computing service) are typically implemented on a separate set of servers from the data plane components 104, while other control plane components 102 (e.g., tier two control plane components such as analytics services) may share virtualized servers with data plane components 104. Resources of the control plane can be provisioned in an account (or accounts) of the cloud provider, while resources of the data plane can be provisioned in respective user accounts.

In some embodiments, the control plane components 102 may include a management component or subsystem, such as a file system namespace service 140, configured to implement aspects of the present disclosure for managing a file system namespace as described in greater detail below. The file system namespace service 140—also referred to herein simply as the namespace service 140 for brevity— may be implemented on a separate set of servers from the data plane components 104, or it may share one or more virtualized servers with data plane components 104. In some embodiments, certain modules or components of the namespace service 140 may be part of the data plane such that they are data plane components 104. For example, components of the namespace service 140 may be implemented as part of a compute server 122 to facilitate certain file system namespace features described herein for the compute server 122 or other compute servers 122.

Control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more customers. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units ("CPUs") or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers 124, which can include persistent storage for storing volumes of customer data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

In some implementations, at least a subset of virtualization management tasks may be performed at one or more offload cards coupled to a host server so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that can be used to restore volumes.

Some customers may desire to use the resources and services of the cloud provider network 100, but for various reasons (e.g., latency in communications with customer devices, legal compliance, security, or other reasons) prefer for these resources and services to be provisioned within their own network, for example on premises of the customer. A piece of the cloud provider network—referred to herein as a "provider substrate extension" or PSE—may be provisioned within the customer's network. A customer may access their PSE via the cloud provider network 100 or their own network, and may use the same APIs to create and manage resources in the PSE as they would use to create and manage resources in the cloud provider network 100 region.

The PSE may be pre-configured, e.g., by the provider network operator, with the appropriate combination of hardware with software and/or firmware elements to support various types of computing-related resources, and to do so in a manner that mirrors the experience of using the cloud provider network 100. For example, one or more PSE servers can be provisioned by the cloud provider within the customer network. As described above, the cloud provider network 100 may offer a set of predefined instance types, each having varying types and quantities of underlying hardware resources. Each instance type may also be offered in various sizes. In order to enable customers to continue using the same instance types and sizes in their PSE as they do in the cloud provider network 100 region, the PSE server can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the cloud provider network 100 region and PSE.

In the manner described above, a PSE forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Example Compute Server and Namespace Service Node

Figure 2:
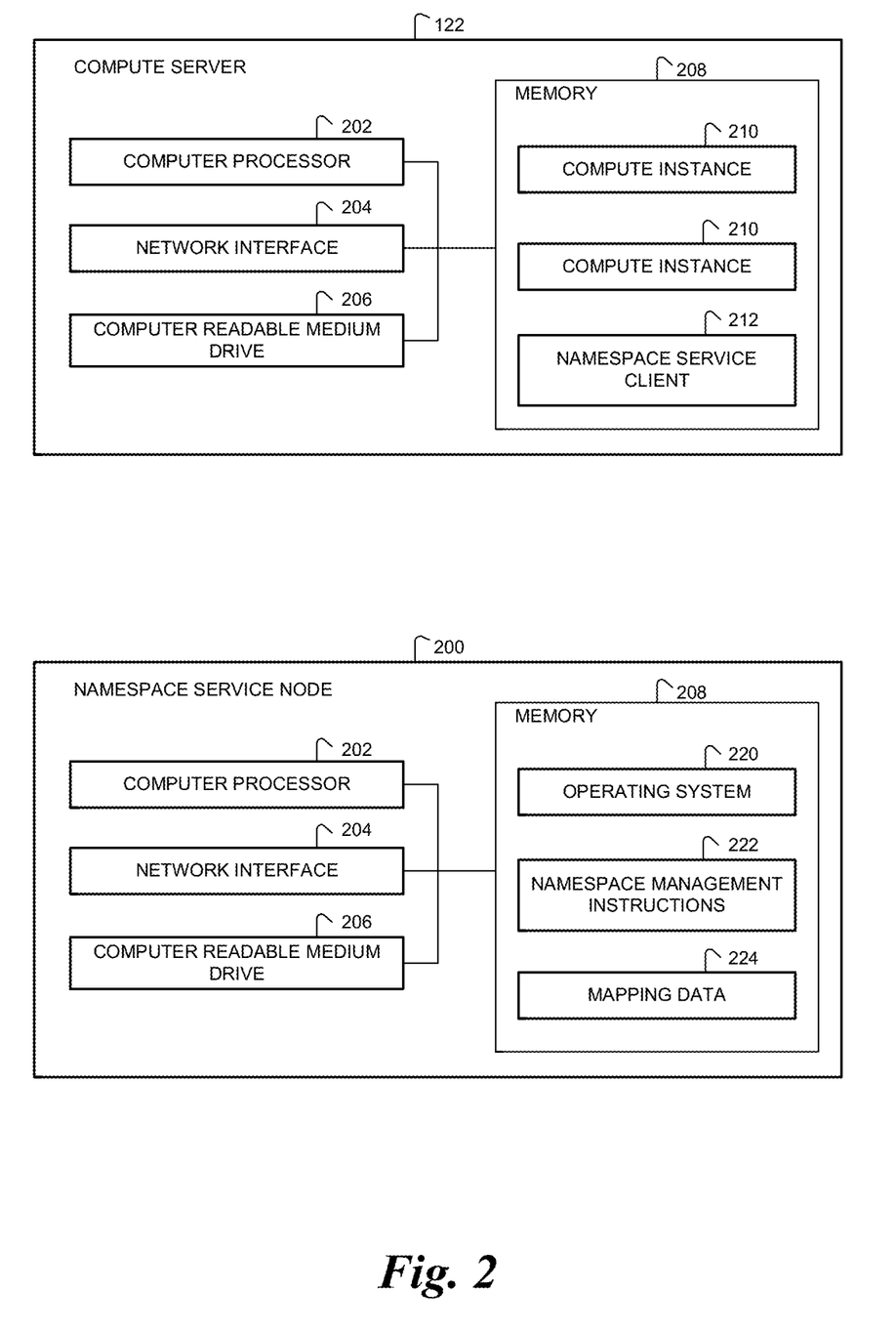
FIG. 2 is a block diagram of illustrative computing devices configured to implement features of file system composition and file system namespace management according to some embodiments

FIG. 2 illustrates various components of an example compute server 122 and namespace service node 200 configured to implement various functionality described herein.

As described above, the compute server 122 may be a physical host computing device on which a one or more compute instances may be hosted, such as a virtual machine instance, an application container, or "serverless" code. There may be any number of such compute servers 122 in the cloud provider network 100. Individual compute servers 122 may be configured with various combinations of compute instances.

As used herein, the term "virtual machine instance" is intended to refer to an execution of software or other executable code that emulates hardware to provide an environment or platform on which software may execute (an "execution environment"). Due to their emulation of hardware, these virtual machine instances are sometimes referred to as "system virtual machines." Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

Compute instances may alternatively include other execution environments, such as software containers, also referred to simply as "containers" for brevity. Containers may provide OS-level virtualization, another virtualization technology known in the art. Containers provide a standard way to package application code, configurations, and dependencies into a single object. Multiple containers may share an operating system installed on a compute server 122 and run as resource-isolated processes. Where references are made herein to VM instances, it should be understood that (unless indication is made to the contrary) a container may be substituted for such instances.

Some execution environments may provide for "serverless" code execution. Generally described, a serverless compute service can enable a user to provide executable code to the cloud provider network 100 (potentially with other supporting data or software, such as libraries, utilities, runtimes, etc.), and later request execution of that code. The cloud provider network 100 may manage storage of the code. In response to a request for execution of the serverless code, the cloud provider network may generate a serverless environment (which may itself be a virtual machine or software container), provision the environment with the code, and execute the code within the environment. Because the cloud provider network 100 handles aspects such as creation of the environment, provisioning of the environment with the requisite data (e.g., the code), and later destruction of the environment, an end user is not required to specifically configure a server to support that execution. Accordingly, such functionality is referred to as "serverless" computing (though, of course, execution nevertheless occurs on a server).

In some embodiments, as shown, a compute server 122 may include: one or more computer processors 202, such as physical central processing units ("CPUs"); one or more network interfaces 204, such as a network interface cards ("NICs"); one or more computer readable medium drives 206, such as a high density disk ("HDDs"), solid state drives ("SSDs"), flash drives, and/or other persistent non-transitory computer-readable media; and one or more computer readable memories 208, such as random access memory ("RAM") and/or other volatile non-transitory computer-readable media.

The computer readable medium drives 206 may be used to store data in support of various compute operations, as described in greater detail below. The computer readable memory 208 may include computer program instructions that one or more computer processors 202 execute in order to implement one or more embodiments. For example, the computer readable memory 208 can store one or more compute instances 210, such as VM instances, containers, serverless code execution environments, or any combinate thereof.

The computer readable memory 208 may also include a namespace service client 212—also referred to herein as a namespace client subsystem—that communicates with the namespace service 140 and provides namespace service functionality to the compute instances 210 as described in greater detail herein. In some embodiments, some or all of the features of the namespace service client 212 may be executed by components other than those illustrated in in FIG. 2. For example, the namespace service client 212 may be implemented on an offload card of the compute server 122 (e.g., a card connected via PCI or PCIe to the physical CPUs and other components of the compute server 122).

A namespace service 140 may be implemented using one or more namespace service nodes 200. In some embodiments, as shown, a namespace service node 200 may include: one or more computer processors 202; one or more network interfaces 204; one or more computer readable medium drives 206; and one or more computer readable memories 208.

The computer readable memory 208 may include computer program instructions that one or more computer processors 202 execute in order to implement one or more embodiments. The computer readable memory 208 can store an operating system 220 that provides computer program instructions for use by the computer processor(s) 202 in the general administration and operation of the namespace service node 200.

In some embodiments, the computer readable memory 208 can further include computer program instructions and other information for implementing aspects of the present disclosure. For example, the computer-readable memory 208 may include namespace management instructions 222 for managing namespaces of one or more compute instances, as described herein. When a namespace management routine is initiated, a corresponding set of executable program instructions stored on a computer readable medium drive 206 may be loaded into computer readable memory 208 and executed by one or more computer processors 202. In some embodiments, a routine—or portions thereof—may be implemented on multiple computing devices and/or multiple processors, serially or in parallel.

The computer readable memory 208 may further include namespace mapping data 224 representing mappings of portions of namespaces (directories, files, etc.) to various storage systems, executable code, and the like as described herein. In some embodiments, some or all of the mapping data 224 may be stored remotely from a namespace service node 200. For example, mapping data 224 may be stored on a remote storage node and accessed by the namespace service node 200 as needed.

With reference to an illustrative example, a compute instance 210 may be instantiated on a compute server 122. The compute instance may be instantiated in response to a request, such as a request from a customer 150 outside of the cloud provider network 100, a request from another compute server 122 inside the cloud provider network 100, etc. The request may include, reference, or otherwise be associated with namespace metadata (e.g., in a configuration file) that specifies mappings of file system objects to storage systems, executable code, or the like. For example, the namespace metadata may specify a virtual machine image stored in the data plane (e.g., at a block store server 124), one or more directories to be mapped to storage system locations (e.g., buckets stored on various object store servers 126, block storage on one or more block store servers 124, etc.), one or more files to be mapped to storage system locations, one or more files to be mapped to executable code (e.g., an application executing in a container compute instance, "serverless" code to be executed in a compute instance, etc.), other mappings, or some combination thereof.

Instantiation of the compute instance 210 may be managed by a control server 112. As part of the instantiation, or at some point thereafter, the namespace service 140 may be employed to configure a namespace for the compute instance. For example, the control server 112 may send a request or command to the namespace service 140 to configure a namespace for the compute instance 210 based on the namespace metadata.

In response to the request or command (or in response to some other event), a namespace service node 200 may initialize a file system namespace for the compute instance 210 (e.g., using a unique name for the compute instance), and map portions of the namespace (e.g., directories and/or files) to one or more storage systems or execution instances. When the compute instance 210 attempts to access a portion of the file system namespace, the request may be routed to the namespace service client 212. If the namespace service client 212 is unable to resolve the portion of the file system namespace (e.g., using cached data from prior requests to the namespace service node 200), the namespace service client 212 can send a request to the namespace service node 200 for resolution of the particular portion of the file system that the compute instance 210 is attempting to access. The namespace service node 200 can resolve the portion of the file system using mapping data 224 to determine the particular storage system, location, executable code, or other target to which the portion of the file system namespace is mapped. The namespace service node 200 may respond to the namespace service client 212 by providing data indicating the target to which the portion of the file system namespace is mapped. The namespace service client 212 may then access the target using the particular API of the target, which may be a different API than the file system API used by the compute instance 210 to attempt to access the portion of the file system.

Example Routine for Composable File System Management

Figure 3:
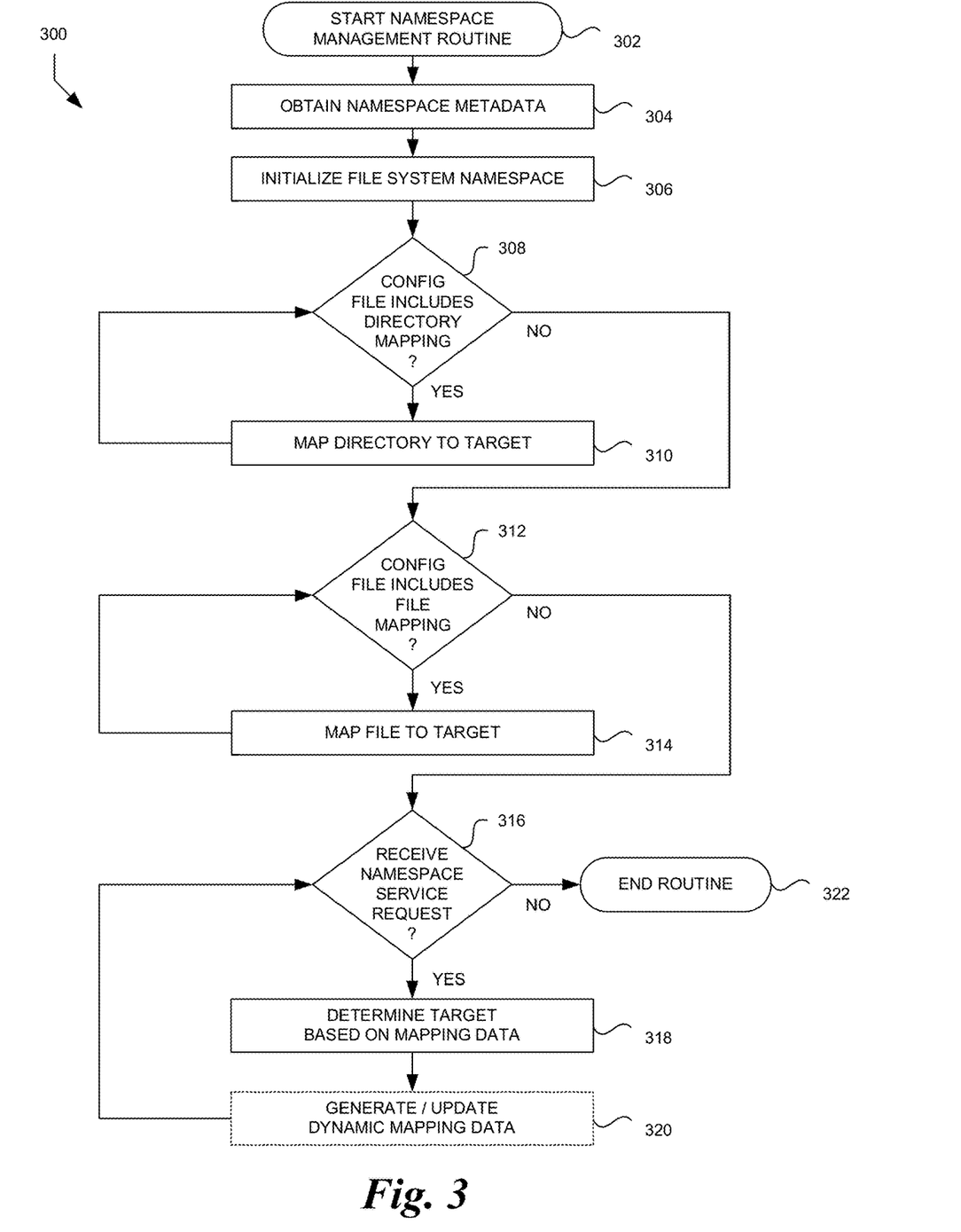
FIG. 3 is a flow diagram of an illustrative routine for composing and managing a file system namespace according to some embodiments.

FIG. 3 is a flow diagram of an example routine 300 that a namespace service node 200 may execute to configure and manage file system namespaces for compute instances. Advantageously, the namespace service node 200 uses mapping data that maps portions of a compute instance's file system namespace (e.g., directories and files) to potentially disparate storage system locations and code execution instances, thus allowing disparate storage systems and code execution instances to be accessed transparently using a unified file system API. Portions of the routine 300 will be described with further reference to the illustrative data flows and interactions shown in FIGS. 4, 5, and 6.

The routine 300 beings at block 302. In some embodiments, routine 300 may begin in response to an event, such as receipt by the namespace service 140 of a request to configure a file system namespace for a compute instance. If the namespace service 140 includes multiple namespace service nodes 200, the request may be assigned to particular namespace service node 200.

At block 304, the namespace service node 200 or some other module or component of the namespace service 140 may obtain namespace metadata (e.g., in a configuration file) for the file system namespace to be configured. Obtaining the namespace metadata may include receiving the file as part of the request, retrieving a configuration file or other form of namespace metadata based on information included in the request (e.g., a location or identifier), etc.

At block 306, the namespace service node 200 or some other module or component of the namespace service 140 may initialize a file system namespace. Initializing the file system namespace may include determining a unique name for the compute instance that is to use file system. For example, the request to configure the file system namespace may include an identifier of the compute instance, or other information from which a name for the compute instance can be derived. The namespace service node 200 may initialize the namespace using the unique identifier of the compute instance as the top level of the file system namespace.

Generally described, a namespace is a set of names that are used to identify and refer to objects. A namespace ensures that all objects have unique names so that they can be identified, accessed, and managed. A namespace may be hierarchical, with a top-level name and any number of sub levels with their own names, where within a given level each name is unique. Sub-levels may be nested or otherwise arranged in an n-level tree structure. The combination of top-level name and sub-level name(s) may be appended to or otherwise used with a name of an object to result in a unique path or address, or an otherwise unique name for the object. Hierarchical file system namespaces organize files in directories. Each directory is a sub-level withing the top-level namespace, and may be considered its own separate namespace. For example, in a particular file system namespace, the file directories "user" and "temp" may both include a file named "foo." The different files may be uniquely referenced by using the directory names in addition to the file names: "/user/foo" and "/temp/foo."

In the current iteration of routine 300, the namespace service node 200 may initialize a file system namespace for the compute instance 210 using the identifier of the compute instance, such as "instance-123," as the top-level name of the file system namespace. In this way, the file system namespace can be uniquely identified from any number of other file system namespaces that the namespace service 140 is managing for other compute instances. Sub-levels (e.g., directories) and individual objects (e.g., files) may be included in the namespace and mapped to other storage locations and/or executable code based on the namespace metadata.

At decision block 308, the namespace service node 200 or some other module or component of the namespace service 140 may determine whether the namespace metadata includes a file system directory to be mapped. If so, the routine 300 may proceed to block 310. Otherwise, if there are no file system directories remaining in the namespace metadata to be mapped, the routine 300 may proceed to decision block 312.

At block 310, the namespace service node 200 or some other module or component of the namespace service 140 may map a file system directory in the file system namespace to another storage location, storage system, executable code, or the like. In some embodiments, the namespace service node 200 may read a particular entry of the namespace metadata, identify a file system directory referenced in the entry, and evaluate the target to which the directory is to be mapped. The namespace service node 200 may generate mapping data for use in resolving the target for future file system operations associated with the mapped directory. For example, the namespace service node 200 may generate a key-value pair in a list (e.g., a dictionary) of mapping data, where the key is the unique name of the file system directory and the value is an address or other data identifying the mapped target.

Figure 4:
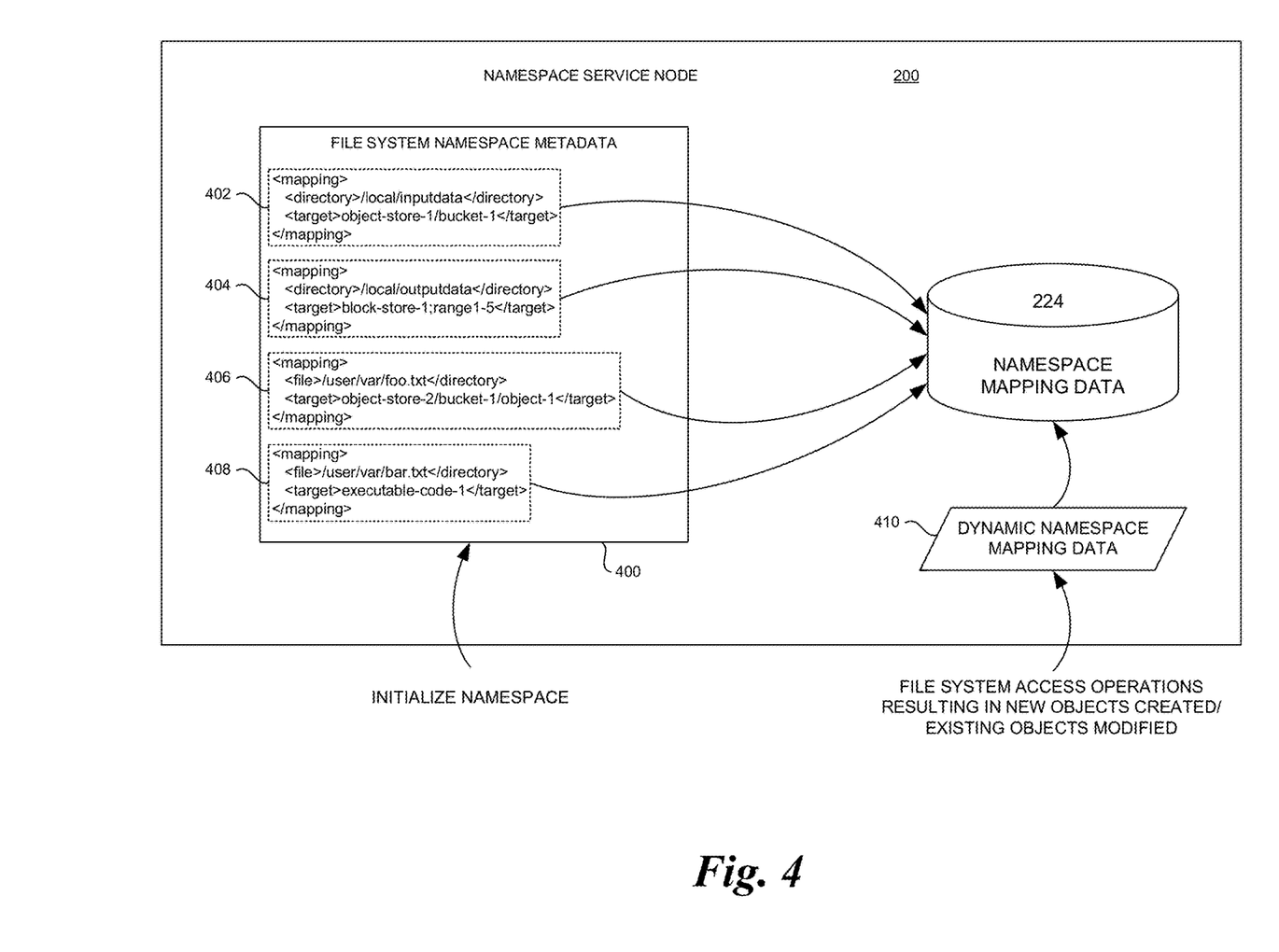
FIG. 4 is block diagram of an illustrative namespace service node using namespace metadata to compose a file system for a compute instance according to some embodiments.

FIG. 4 illustrates namespace service node 200 analyzing namespace metadata 400 and generating mapping data 224 based on the analysis. As shown, the namespace metadata 400 may include mapping 402 that indicates a particular file system directory ("/local/inputdata") is to be mapped to an object storage system ("object-store-1"), and that the data in the directory is to be accessed in a particular bucket ("bucket-1") of the object storage system. The namespace service node 200 may store, in mapping data 224, data reflecting the mapping. For example, the namespace service node 200 may store an address or other information to be used to access the target bucket.

The routine 300 may then return to decision block 308 to determine whether there are any additional file system directories to be mapped. For example, as shown in FIG. 4, the namespace metadata 400 may include another directory mapping 404 that indicates another file system directory ("/local/outputdata") is to be mapped to a different storage system that uses a different type of storage. In this example, the directory is to be mapped to a block storage system ("block-store-1"), and that the data in the directory is to be accessed at a particular range of blocks ("range1-5") of the block storage system. The namespace service node 200 may store, in mapping data 224, data reflecting the mapping. For example, the namespace service node 200 may store an address or other information to be used to access the target range.

At decision block 312, the namespace service node 200 or some other module or component of the namespace service 140 may determine whether the namespace metadata includes a file to be mapped. If so, the routine 300 may proceed to block 314. Otherwise, if there are no files remaining in the namespace metadata to be mapped, the routine 300 may proceed to decision block 316.

At block 314, the namespace service node 200 or some other module or component of the namespace service 140 may map a file in the file system namespace to another storage location, storage system, executable code, or the like. In some embodiments, the namespace service node 200 may read a particular entry of the namespace metadata, identify a file referenced in the entry, and evaluate the target to which the file is to be mapped. The namespace service node 200 may generate mapping data for use in resolving the target for future file system operations associated with the mapped file. For example, the namespace service node 200 may generate a key-value pair in a list (e.g., a dictionary) of mapping data, where the key is the unique namespace file name and the value is an address or other data identifying the mapped target.

FIG. 4 illustrates namespace service node 200 analyzing a file mapping 406 in a namespace metadata 400 and generating mapping data 224 based on the analysis. As shown, the namespace metadata 400 may include mapping 406 that indicates a particular file ("/user/var/foo.txt") is to be mapped to an object storage system ("object-store-2"), and that the data in the file is to be accessed as a particular object ("object-1") in a particular bucket ("bucket-1") of the object storage system. The namespace service node 200 may store, in mapping data 224, data reflecting the mapping. For example, the namespace service node 200 may store an address or other information to be used to access the target object.

The routine 300 may then return to decision block 312 to determine whether there are any additional files to be mapped. For example, as shown in FIG. 4, the namespace metadata 400 may include another file mapping 408 that indicates another file ("/user/var/bar.txt") is to be mapped to executable code. In this example, the file is to be mapped to execution of code ("executable-code-1") such that when a file system operation to access the file is initiated, the function is executed. Illustratively, the code may be an application executing in a compute instance (e.g., in a VM or container), serverless code to be executed, or some other code to be executed. Execution of the code may result in retrieval or dynamic generation of data to be returned as though the data is in the indicated file. The namespace service node 200 may store, in mapping data 224, data reflecting the mapping. For example, the namespace service node 200 may store a function signature or other information to be used to execute the code.

In some embodiments, the namespace metadata may specify further information regarding the mapping of a directory or file, such as a naming convention, a format, or the like. For example, a mapping of a file (e.g., mapping 406) may further include data regarding appending the name of the compute instance 210 (e.g., "instance-123") to the saved object (e.g., so that the object is named "instance-123_foo.txt"). Illustratively, this may be done in cases where multiple compute instances are instantiated using the same namespace metadata, and their output is to be tracked by an external process. Appending the name of the compute instance to the object can serve to differentiate the objects of the various compute instances.

At decision block 316, the namespace service node 200 or some other module or component of the namespace service 140 may determine whether a namespace service request has been received (e.g., from a namespace service client 212 associated with a compute instance 210). If so, the routine 300 may proceed to block 318. Otherwise, if no namespace service request is received, the routine 300 may terminate at block 322.

At block 318, the namespace service node 200 or some other module or component of the namespace service 140 may generate a response to the namespace service request based on mapping data 224. The namespace service request may include data representing a directory and/or a file that is the subject of a file system access operation initiated by the compute instance 210 for which the namespace service node 200 initialized and configured the namespace. The namespace service node 200 may use mapping data 224 to resolve the target that is to be accessed or invoked based on the file system access operation.

At block 320, the namespace service node 200 or some other module or component of the namespace service 140 may in some cases generate and/or update dynamic mapping data 410 based on the file system access operation that is the subject of the received namespace service request. If a new file or other data storage object is being created, then namespace mapping data may be dynamically created so that the namespace service 140 can respond to future namespace service requests associated with the new object. For example, a compute instance 210 may initiate a file system access operation to create a new file in a particular directory. The namespace service request received by the namespace service 140 may be processed to determine which remote storage location is to be mapped to the new file, provision the remote storage location if needed, and dynamically generate namespace mapping data so that the namespace service 140 can resolve future namespace service requests associated with file system access operations that involve the new file.

In some embodiments, the same remote storage location may not necessarily be used for all subsequent file system access operations associated with a data object. For example, read operations may be mapped to a first location, while write operations are mapped to a different second location. This may be done to preserve the source data read from the first location (e.g., if any changes are to be discarded or if the data is otherwise to be considered "read only"), to improve performance of write operations by using a higher-performance cache for write operations at the second location, or for other reasons. Examples of using different storage location mappings for a single data item (e.g., using a write back cache, treating a file system as a read-through cache in front of an object storage service, etc.) are described below. The namespace service 140 uses dynamic mapping data 410 to manage the particular locations and access methods (API calls, data translations, etc.).

Figure 5:
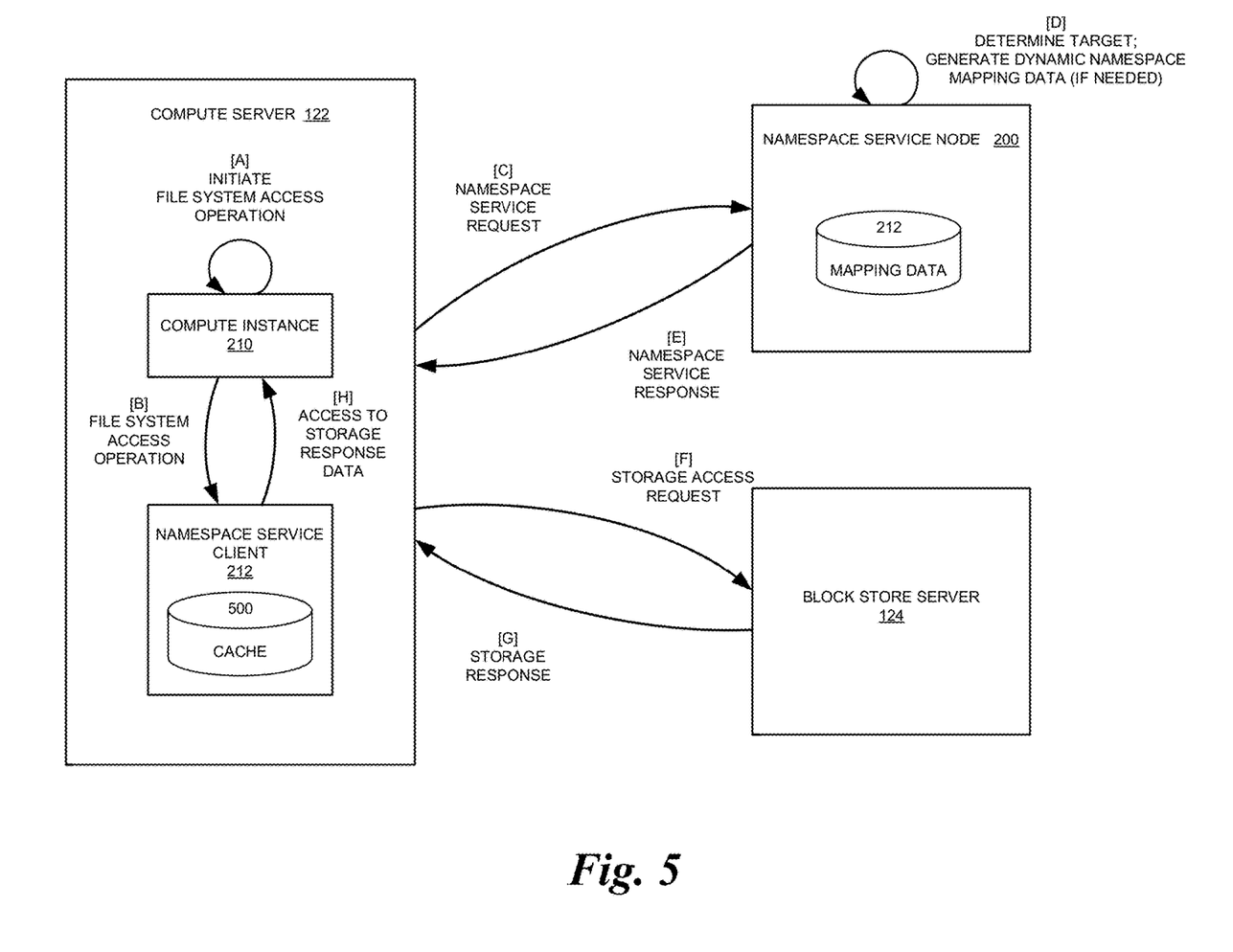
FIG. 5 is a block diagram of illustrative data flows and interactions of a compute server, a namespace service, and a storage system according to some embodiments.

FIG. 5 illustrates compute instance 210, executing on compute server 122, initiating a file system access operation at [A]. The compute instance 210 may initiate the file system access operation using a file system API. For example, the file system access operation may be a command to write new file "output-file-1" to the "/local/outputdata" directory. When the compute instance 210 initiates the file system access operation, the operation may be routed at [B] to a component of the compute server 122, such as a namespace service client 212, that resolves file system access operations using the namespace service 140.

The namespace service client 212 may send a namespace service request at [C] to the namespace service 140, where the namespace service request may be handled by a namespace service node 200. The namespace service request may include data regarding the particular portion of the file system namespace that is the subject of the file system access operation. In the present example, the namespace service request may include representing the "/local/outputdata" directory being accessed as part of the write command. In some embodiments, the namespace service request may include data regarding the operation being performed. Such data may be used to make different resolution determinations depending upon the operation. For example, read and write operations may be mapped to different locations of a storage system, different storage systems altogether, or different types of targets (e.g., one type of operation may be mapped to a storage location, while another type of operation to the same file system object may be mapped to executable code).

In some embodiments, the namespace service client 212 may include a namespace service client cache 500 in which resolution data received in response to prior namespace mapping requests is stored. Advantageously, use of such a cache 500 may reduce the number of namespace service requests issued to the namespace service 140, and thereby reduce latency in accessing data that is the subject of a file system access operation. If the cache 500 does not include any resolution data for resolving the current file system access operation, then the namespace service client 212 may proceed with sending the namespace service request to the namespace service 140.

At [D], in response to the namespace service request, the namespace service node 200 can determine the target mapped to the portion of the file system and/or the file system access operation. The target may be determined using the mapping data 224 that was generated from analysis of the namespace metadata. In the present example, the namespace service node 200 may determine that the directory "/local/outputdata" is mapped to the block storage system "block-store-1" at location "range1-5."

At [E], the namespace service node 200 may generate a response to the namespace service request based on the determined mapping, and send the response to the namespace service client 212. In some embodiments, the response may include data representing the location and/or executable code that is the target to which the file system access operation is mapped. In the present example, the response may be or include "block-store-1;range1-5." In some embodiments, the response may also or alternatively include data regarding the storage system access operation that corresponds to the file system access operation. For example, the response may include or indicate the write command to be used to write the file to the block storage system, where the block storage system exposes a different API than the file system API used by the compute instance to initiate the file system access operation.

At [F], the namespace service client 212 may generate and send an appropriate command to the block store server 124 indicated in the response from the namespace service 140. In the present example, the namespace service client 212 sends a write command to the block storage system "block-store-1" via the block storage system's API. The command may be a command to write data, provided by the compute instance 210 as file "output.txt," to the mapped range of blocks.

At [G], the namespace service client 212 may in some cases receive a response from the target of the operation. For example, if a file system access operation is a data retrieval operation, the response may include the retrieved data. As another example, if the operation is a data write operation, the response may indicate success or failure of the write operation. Access to the response data may be provided to the compute instance 210 at [H] as though the data is being accessed from the file system.

Figure 6:
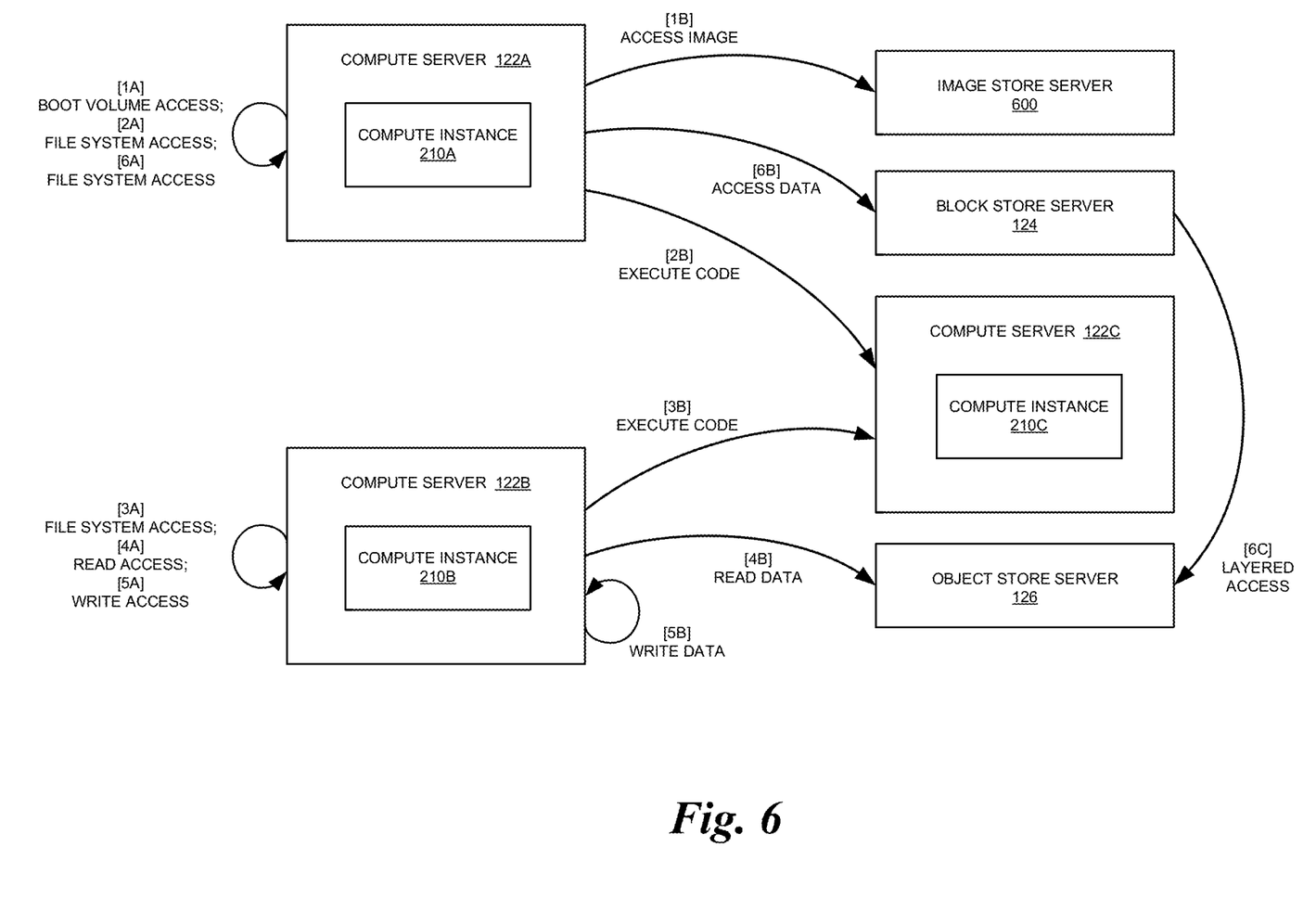
FIG. 6 is a block diagram of illustrative data flows and interactions of compute servers and various computing resource servers according to some embodiments.

FIG. 6 illustrates a variety of file system access operations mapped to other data storage operations, function executions, and the like. The communications to and from the namespace service 140 may be performed as described above, and are not shown in the FIG. 6 for simplicity of illustration. It will be appreciated that any or all of the various file system access operations may be resolved to other operations based on requests to the namespace service 140 and/or resolution data in a local cache of the host computing device on which the compute instances are executing.

Compute instance 210A may be instantiated on compute server 122A. Boot operations to a boot volume of the file system namespace of the compute instance 210A may be mapped to an image stored on an image store server 600. For example, at [1A], the compute instance 210A may initiate a boot volume access operation, and the operation may be mapped to and executed as a read request to the image store server 600 at [1B].

File system access operations, such as certain read operations, may be mapped to execution of code instead of (or in addition to) accessing a storage system. For example, at [2A] compute instance 210A may initiate a file system access operation to read from a file, and the operation may be mapped to and executed as a function call to code executing in compute instance 210C on compute server 122C at [2B]. Illustratively, compute server 122C may generate a response and provide the response back to the compute instance 210A, where it can be "read" as the result of the file system read operation.

In some embodiments, multiple compute instances may access the same executable code, just as multiple compute instances may access the same storage system. For example, multiple compute instances 210A, 210B may be instantiated and use the same namespace metadata to compose file systems and configure corresponding file system namespaces. An executable function may be used to coordinate execution and/or facilitate communication among the different compute instances 210A, 210B using the same unified file system API that the compute instances 210A, 210B use to perform other file system access operations. As shown, compute instance 210B executing on compute server 122B initiates a file system access operation at [3A], and the operation is performed at [3B] as a function call to the code executing on compute server 122C.

In some embodiments, multiple storage operations may be mapped to a single file system access operation. For example, read requests may be mapped to one operation (e.g., a read from one particular network-bases storage system) while write requests may be mapped to a different operation (e.g., a write to a different storage system, such as a local disk of the host computing device). As shown in FIG. 6, compute instance 210B may initiate a file system access operation that is a read request at [4A], that is mapped to a read request to an object store server 126 at [4B]. The same compute instance 210B may initiate a file system access operation to the same directory or file, as a write request at [5A]. The write request may be mapped at [5B] to a write request to a different data store, such as a local data store of compute server 122B. In some embodiments, future read requests for the same directory may be evaluated to determine whether to retrieve data from the object store server 126, or whether to send the request to the data store where data was previously written by the compute instance 210B. Thus, a single compute instance may request the same data access operation to the same directory or file, and the operation may be dynamically mapped differently depending upon the context in which the data access operation was issued, and potentially may be mapped such that different APIs are used to complete the operation.

As another example, different storage devices and/or systems may be layered and used in combination. For example, compute instance 210A may issue a file system access command at [6A] that is mapped to a corresponding operation at [6B] to one storage system (e.g., block store server 124) that is used as a cache (e.g., a write back cache or read through cache) for another storage system (e.g., object store server 126) at [6C].

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a host computing device comprising one or more processors and computer-readable memory, wherein the host computing device is configured to execute a compute instance and a namespace service client, and wherein the namespace service client receives file system commands generated by the compute instance using a file system application programming interface (API); and
   a namespace service comprising one or more computing devices, wherein the namespace service is configured to:
      receive, from the namespace service client, a namespace service request comprising data representing a file and directory in a namespace associated with the compute instance, wherein the namespace service request is based on a first file system command generated by the compute instance using the file system API;
      determine, based at least partly on mapping data associated with the namespace, a network-based storage system mapped to the file, wherein the network-based storage system is to be accessed using a storage system API that is different from the file system API; and
      send, to the namespace service client, a namespace service response comprising data representing the network-based storage system mapped to the file; and
   wherein the host computing device is further configured to:
      access data stored on the network-based storage system based at least partly on execution of a storage system operation on the network-based storage system mapped to the file, wherein the storage system operation is different from the first file system command; and
      provide, to the compute instance, access to the data stored on the network-based storage system.

2. The system of claim 1, wherein the host computing device is further configured to:
   store resolution data regarding the namespace service response in a namespace service client cache;
   determine, subsequent to storing the resolution data, that the compute instance is to access the file;
   access the resolution data in the namespace service client cache; and
   access data stored on the network-based storage system based at least partly on the resolution data.

3. The system of claim 1,
   wherein the namespace service is further configured to:
      receive, from the namespace service client, a second namespace service request comprising data representing a second file in the namespace;
      determine, based at least partly on the mapping data, executable code mapped to the second file; and
      send, to the namespace service client, a second namespace service response comprising data representing the executable code mapped to the second file; and
   wherein the host computing device is further configured to:
      send a request to execute the executable code;
      receive output of the executable code; and
      provide to the compute instance access to the output of the executable code as data associated with the second file.

4. The system of claim 1,
   wherein the namespace service is further configured to:

receive, from the namespace service client, a second namespace service request comprising data representing a second file in the namespace;

determine, based at least partly on the mapping data, a second network-based storage system mapped to the second file, wherein the second network-based storage system is to be accessed using a second storage system API that is different from both the file system API and the storage system API;

send, to the namespace service client, a second namespace service response comprising data representing the second network-based storage system; and wherein the host computing device is further configured to:

access second data stored on the second network-based storage system based at least partly on the second namespace service response and the second storage system API; and provide, to the compute instance, access to the second data stored on the second network-based storage system using the file system API.

5. A computer-implemented method comprising:

under control of a computing system comprising memory and one or more computer processors configured to execute specific instructions:

receiving a first request representing a first file system access operation associated with a directory of a file system namespace;

determining, based at least partly on mapping data associated with the file system namespace, a network-based storage system mapped to the directory;

generating a first response to the first request based at least partly on execution of a storage system operation on the network-based storage system mapped to the directory, wherein the storage system operation is different from the first file system access operation;

receiving a second request representing a second file system access operation associated with a file of the file system namespace;

determining, based at least partly on the mapping data, executable code mapped to the file; and generating a second response to the second request based at least partly on execution of the executable code mapped to the file, wherein execution of the executable code is different from execution of the second file system access operation.

6. The computer-implemented method of claim 5, further comprising:

receiving an instantiation request to instantiate a compute instance, wherein the instantiation request is associated with namespace metadata comprising data regarding a file system of the compute instance; and instantiating the compute instance on a host computing device, wherein the compute instance is associated with the file system namespace.

7. The computer-implemented method of claim 6, further comprising:

generating the file system namespace;
analyzing the namespace metadata; and
based on analyzing the namespace metadata:
mapping the directory in the file system namespace to the network-based storage system; and
mapping the file in the file system namespace to the executable code.

8. The computer-implemented method of claim 7, further comprising mapping write operations associated with the directory to a second storage system different from the network-based storage system, wherein mapping the directory to the network-based storage system comprises mapping read operations associated with the directory to the network-based storage system.

9. The computer-implemented method of claim 7, further comprising mapping write operations associated with the directory to a local storage system of the host computing device, wherein data written based on a write operation to the local storage system is not written to the network-based storage system.

10. The computer-implemented method of claim 6, further comprising:

executing, by the host computing device, an application within the compute instance;

generating, by the application, the first file system access operation; and sending, by a namespace client subsystem of the host computing device, the first request to the computing system.

11. The computer-implemented method of claim 10, further comprising:

receiving, by the namespace client subsystem, the first response from the computing system; and caching, by the namespace client subsystem, the first response.

12. The computer-implemented method of claim 10, further comprising:

sending, by the namespace client subsystem, a third request to execute the executable code;

receiving, by the namespace client subsystem, output of the executable code; and providing, by the namespace client subsystem to the compute instance, access to the output of the executable code based at least partly on the second file system access operation, wherein access to output of the executable code is provided as data associated with the file.

13. The computer-implemented method of claim 5, further comprising:

receiving a third request representing a third file system access operation associated with a second file of the file system namespace;

determining, based at least partly on the mapping data, a second network-based storage system mapped to the second file, wherein the second network-based storage system is to be accessed using a second storage system operation that is different from both the storage system operation and the third file system access operation; and generating a third response to the third request based at least partly on the second network-based storage system mapped to the second file.

14. The computer-implemented method of claim 6, further comprising:

receiving a request to generate a plurality of namespaces; and generating a plurality of namespaces using the namespace metadata, wherein individual namespaces are associated with individual compute instances of a plurality of compute instances.

15. A system comprising:

computer-readable memory storing executable instructions; and one or more computer processors in communication with the computer-readable memory and programmed by the executable instructions to at least:

receive a first request representing a first file system access operation associated with a file of a file system namespace;

determine, based at least partly on mapping data associated with the file system namespace, a network-based storage system mapped to the file;

generate a first response to the first request based at least partly on execution of a storage system operation on the network-based storage system mapped to the file, wherein the storage system operation is different from the first file system access operation;

receive a second request representing a second file system access operation associated with a directory of the file system namespace;

determine, based at least partly on the mapping data, executable code mapped to the directory; and generate a second response to the second request based at least partly on execution of the executable code mapped to the directory, wherein execution of the executable code is different from execution of the second file system access operation.

16. The system of claim 15, wherein the one or more computer processors are programmed by further executable instructions to:

receive an instantiation request to instantiate a compute instance, wherein the instantiation request is associated with namespace metadata comprising data regarding a file system of the compute instance; and instantiate the compute instance on a host computing device, wherein the compute instance is associated with the file system namespace.

17. The system of claim 16, wherein the one or more computer processors are programmed by further executable instructions to:

generate the file system namespace;
analyze the namespace metadata; and
based on analyzing the namespace metadata:
map the file in the file system namespace to the network-based storage system; and
map the directory in the file system namespace to the executable code.

18. The system of claim 17, wherein the one or more computer processors are programmed by further executable instructions to map write operations associated with the file to a second storage system different from the network-based storage system, wherein read operations associated with the file are mapped to the network-based storage system.

19. The system of claim 18, further comprising the host computing device, wherein the host computing device is configured to:

execute an application within the compute instance;
generate, using the application, the first file system access operation;
send, using a namespace client subsystem, the first request;
receive the first response using the namespace client subsystem; and
cache the first response.

20. The system of claim 15, wherein the mapping data associated with the file system namespace represents a first mapping of the file to network-based storage system, and a second mapping of the file to a second network-based storage system as one of a write back cache for the network-based storage system or read through cache for the network-based storage system.

* * * * *